United States Patent
Min et al.

(10) Patent No.: US 9,773,289 B2
(45) Date of Patent: Sep. 26, 2017

(54) AUTOMATIC IMAGE SELECTING APPARATUS AND METHOD

(71) Applicant: Samsung Electronics Co., Ltd., Suwon-si (KR)

(72) Inventors: Yun Hong Min, Seoul (KR); In Chul Song, Suwon-si (KR); Ba Rom Jeon, Seoul (KR); Hee Youl Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 14/672,796

(22) Filed: Mar. 30, 2015

(65) Prior Publication Data
US 2015/0278979 A1    Oct. 1, 2015

(30) Foreign Application Priority Data

Mar. 31, 2014  (KR) .................. 10-2014-0038073

(51) Int. Cl.
  *G06T 1/00*    (2006.01)
  *G06K 9/00*    (2006.01)
  *G06K 9/62*    (2006.01)
(52) U.S. Cl.
  CPC ........ *G06T 1/0007* (2013.01); *G06K 9/00523* (2013.01); *G06K 9/00671* (2013.01); *G06K 9/00684* (2013.01); *G06K 9/6262* (2013.01)
(58) Field of Classification Search
  None
  See application file for complete search history.

(56) References Cited

U.S. PATENT DOCUMENTS

| | | | |
|---|---|---|---|
| 2005/0271251 A1* | 12/2005 | Russell | G06K 9/00288 382/103 |
| 2008/0062291 A1 | 3/2008 | Sako et al. | |
| 2012/0262593 A1 | 10/2012 | Choi et al. | |
| 2012/0281913 A1* | 11/2012 | Kutaragi | G06T 19/006 382/165 |
| 2012/0294514 A1* | 11/2012 | Saunders | H04N 1/00196 382/159 |

FOREIGN PATENT DOCUMENTS

| | | |
|---|---|---|
| EP | 2428915 A2 | 3/2012 |
| EP | 2521096 A1 | 11/2012 |
| JP | 2010-41527 A | 2/2010 |
| KR | 10-2007-0105074 A | 10/2007 |
| KR | 10-2010-0066968 A | 6/2010 |
| KR | 10-2012-0118144 A | 10/2012 |

OTHER PUBLICATIONS

Extended European Search Report issued on Oct. 8, 2015 in counterpart European Application No. 15161865.9 (7 pages, in English).
Kanade, Takeo, and Martial Herbert. "First-person vision." *Proceedings of the IEEE* 100.8 (2012): 2442-2453. (12 pages, in English).

* cited by examiner

*Primary Examiner* — Delomia L Gilliard
(74) *Attorney, Agent, or Firm* — NSIP Law

(57) ABSTRACT

An automatic image selecting apparatus including an image receiver configured to receive an image; a feature extractor configured to extract a feature from the image; and a category determiner configured to determine whether the extracted feature matches predetermined category identification reference data used for determining whether to store the image.

33 Claims, 15 Drawing Sheets

AUTOMATIC IMAGE SELECTING APPARATUS AND METHOD

CROSS-REFERENCE TO RELATED APPLICATIONS

This application claims the benefit under 35 U.S.C 119(a) of Korean Patent Application No. 10-2014-0038073 filed on Mar. 31, 2014, in the Korean Intellectual Property Office, the entire disclosure of which is incorporated herein by reference for all purposes.

BACKGROUND

1. Field

The following description relates to an automatic image selecting technology, and more specifically to a technology of selectively processing images based on category recognition of images.

2. Description of Related Art

In general, smart glasses are a wearable computing device that are worn on a user's head and include various functions such as those of a smart phone. The smart glasses may display not only a real world, but also virtual reality, such as augmented reality, using a head-up display (HUD). In addition, in contrast to a smart phone and a smart watch, the smart glasses have an advantage in recording a scene in front of a user's eyes at a line of view of the user. For this reason, smart glasses are expected to be used as a device that can overcome limitations of human memory capacity. However, continuously storing images may cause waste of a storage space since images that are meaningless and insignificant to a user may be recorded.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an automatic image selecting apparatus includes an image receiver configured to receive an image; a feature extractor configured to extract a feature from the image; and a category determiner configured to determine whether the extracted feature matches predetermined category identification reference data used for determining whether to store the image.

The automatic image selecting apparatus may further include an operation controller configured to control an operation associated with storage of the image in accordance with a determination made by the category determiner.

The image receiver may be further configured to receive the image from image data currently displayed on a display for a user.

The image receiver may be further configured to receive the image from image data that are captured by and received from a camera.

The image receiver may be further configured to receive the image from image data received over a communication network.

The image receiver may be further configured to receive the image from training data including images that are predetermined to recognize a specific category; and the automatic image selecting apparatus may further include a feature learner configured to update the predetermined category identification reference data in accordance with a determination made by the category determiner.

The predetermined category identification reference data may include a plurality of category identification reference data, each of which is predetermined to recognize a different category.

The operation controller may be further configured to output a control signal to control an operation of storing the image in a local storage medium.

The operation controller may be further configured to output a control signal to control an operation of transmitting the image to a remote storage medium over a communication network and storing the image in the remote storage medium.

In another general aspect, an automatic image selecting method includes receiving an image; extracting a feature from the image; and determining whether the extracted feature matches predetermined category identification reference data used for determining whether to store the image.

The automatic image selecting method may further include controlling an operation associated with storing the image in accordance with a result of the determining.

The receiving of an image may include receiving the image from image data currently displayed on a display for a user.

The receiving of an image may include receiving the image from image data that is captured by and received from a camera.

The receiving of an image may include receiving the image from image data received over a communication network.

The receiving of an image may include receiving the image from training data including images predetermined to recognize a specific category; and the automatic image selecting method may further include updating the predetermined category identification reference data in accordance with a result of the determining.

The predetermined category identification reference data may include a plurality of category identification reference data, each of which is predetermined to recognize a different category.

The automatic image selecting method may further include outputting a control signal to control an operation of storing the image in a local storage medium.

The automatic image selecting method may further include outputting a control signal to control an operation of transmitting the image to a remote storage medium over a communication network and storing the image in the remote storage medium.

In another general aspect, a non-transitory computer-readable storage medium stores computer-implementable instructions that, when executed by a processor of a computing device including a camera and a display, cause the processor to perform operations including receiving an image that is captured by the camera and currently displayed on the display; extracting a feature from the image and outputting the extracted feature as an image feature; and determining whether the extracted feature matches predetermined category identification reference data used for determining whether to store the image.

The operations may further include outputting a control signal to control an operation associated with storage of the image in accordance with a result of the determining.

The operations may further include receiving, as the image, an image from image data received over a communication network.

The operations may further include receiving, as the image, an image from training data including images predetermined to belong to the specific category; and updating the predetermined category identification reference data in accordance with a result of the determining.

The predetermined category identification reference data may include a plurality of category identification reference data, each of which is predetermined to recognize a different category.

The operations may further include outputting a control signal to control an operation of storing the image in a local storage medium.

The operations may further include outputting a control signal to control an operation of converting the image into an image signal, transmitting the image signal to a remote storage medium, and storing the image signal in the remote storage medium.

The computer-implementable instructions may be provided as an independent application predetermined to recognize at least one specific category.

The computer-implementable instructions may be provided as an independent application able to learn to recognize at least one category determined by a user.

In another general aspect, a computing device includes a camera; a display; a processor; and a computer-readable storage medium storing computer-implementable instructions that, when executed by the processor, cause the processor to perform operations including receiving an image that is captured by the camera and currently displayed on the display; extracting a feature from the image and outputting the extracted feature as an image feature; and determining whether the extracted feature matches predetermined category identification reference data used for determining whether to store the image.

The operations may further include outputting a control signal to control an operation associated with storage of the image in accordance with a result of the determining.

The computing device may further include a communication module configured to receive image data over a communication network; and the operations may further include receiving, as the image, an image from the image data received over the communication network.

The operations may further include receiving, as the image, an image from training data including images predetermined to belong to a specific category; and updating the predetermined category identification reference data in accordance with a result of the determining.

The computing device may further include a communication module configured to receive image data over a communication network; and the operations may further include, receiving, as the image, an image from training data including images that are received by the communication module and are predetermined to belong to a specific category.

The predetermined category identification reference data may include a plurality of category identification reference data, each of which is predetermined to recognize a different category.

The operations may further include outputting a control signal to control an operation of storing the image in a local storage medium.

The computing device may further include a communication module configured to transmit image data to a remote storage medium over a communication network; and the instructions may further include outputting a control signal to control an operation of transmitting the image to the remote storage medium and storing the image in the remote storage medium.

The computer-implementable instructions may be provided as an independent application predetermined to recognize at least one specific category.

The computer-implementable instructions may be provided as an independent application able to learn to recognize at least one category determined by a user.

Other features and aspects will be apparent from the following detailed description, the drawings, and the claims.

DETAILED DESCRIPTION

Figure 1:
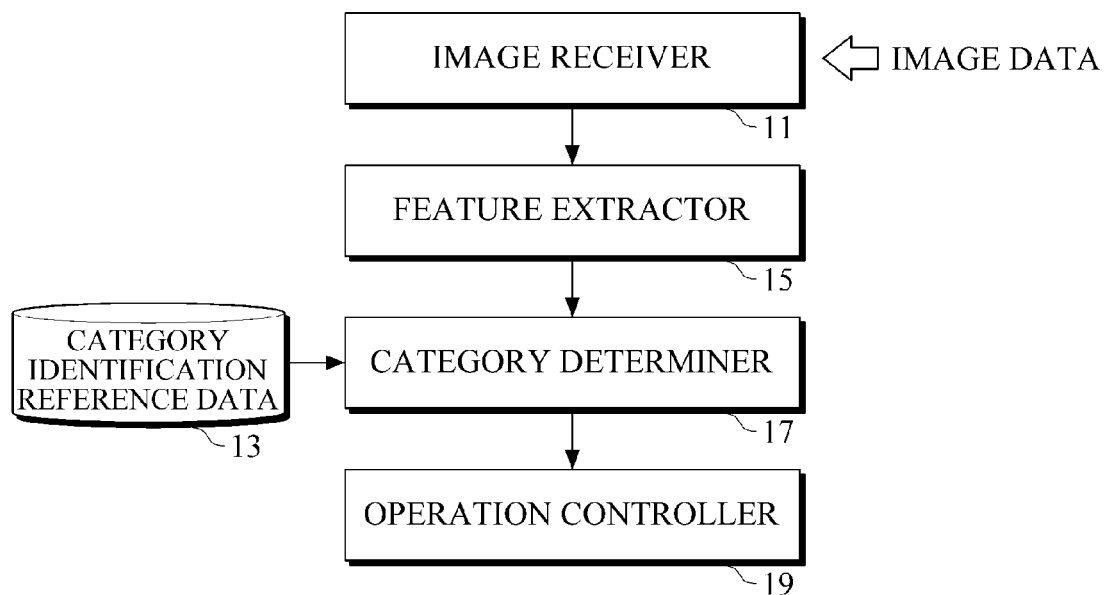
FIG. 1 illustrates an example of an automatic image selecting apparatus.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The leftmost digit or digits of a reference numeral identify the figure in which the reference numeral first appears. The drawings may not be to scale, and the relative size, proportions, and depiction of elements in the drawings may be exaggerated for clarity, illustration, and convenience.

In general, a camera included in smart glasses is able to capture a scene in front of a user's eyes at the user's eye level continuously and seamlessly in time. Images captured by the camera of the smart glasses may be stored in a local memory of the smart glasses. Alternatively, the captured images may be converted into an image signal by a communication module provided in the smart glasses, transmitted to a remote storage space, such as a smart phone of the user or a cloud remote from the user, over a short range or broad-bandwidth communication network, and then the converted image may be stored in the remote storage space.

However, storage capacity of the local memory of a wearable computing device, that is, smart glasses, is likely to be limited. To overcome this problem, the smart glasses may employ a remote storage. However, the remote storage may be affected by a communication network disruption when the computing device transmits images to a remote storage space over the communication network. Therefore, it is desirable not to continuously store every image captured by a camera of smart glasses. To solve this, a manual selecting method may be employed to store only images that are meaningful to a user.

However, in the manual selecting method, a user has to keep monitoring displayed images. In addition, while monitoring the images, the user needs to determine whether each of the monitored images needs to be stored. Moreover, when determining that a specific image needs to be stored, the user has to input a command for initiating a storage operation. Thus, an image may not be stored when the user does not monitor the image, when the user is not able to determine whether the image needs to be stored, or when the user is not able to input a command for storing the image.

According to examples of an automatic image selecting apparatus and method, there is provided an automatic image selecting technique based on category recognition of images. This technique enables selectively storing or processing only images having content of a specific category that is meaningful to a user among various images without the user's monitoring and determining. In addition, this technique allows only selected images, not every image, to be stored or to be processed so that a storage space will not be wasted. Further, this technique does not require manual control by a user so that images will be automatically stored or processed even without the user's attention.

In the following description, the term "category recognition" is used to indicate that a category of an image is recognized directly based on content included in the image.

One of the conventional methods of recognizing a category of an image is a tag method, which indirectly utilizes content of an image. The tag method is a method of adding a text-type tag to an image as metadata. For example, in a case where a specific image includes content of people skiing on a mountain slope, text, such as "snow", "mountain", "ski", and "people", may be added as tags. A text-type tag may be used when searching for an image or determining an image to belong to a specific category.

In comparison to the tag method, which indirectly utilizes content of an image, an automatic image selecting apparatus and method according to an example of this disclosure recognizes an image as belonging to a specific category directly based on content of the image. The content of the image may be identified directly by analyzing features of the image.

Hereinafter, an automatic image selecting apparatus and method are described with the examples of smart glasses, which include a head-up display, a camera and/or a communication module for communication with a remote device, and an independent application or an independent hardware, such as a category recognizer. However, this example is merely exemplary, and the automatic image selecting apparatus and method may be applied to a smart watch, a smart phone, a tablet, a laptop, a desktop, a server, a client, or any other computing device. In addition, instead of the independent application, a web browser, a camera app, a multimedia player, and any other plug-in or component module of an application may be included in the automatic image selecting apparatus and method.

FIG. 1 illustrates an example of an automatic image selecting apparatus.

Referring to FIG. 1, an automatic image selecting apparatus 10 includes an image receiver 11, category identification reference data 13, a feature extractor 15, a category determiner 17, and an operation controller 19.

The image receiver 11 is a component for receiving a specific image from received image data. For example, image data may be a video file including continuous still images, and a received image may be one of the still images of the video file. The image receiver 11 may receive an image from image data derived from various sources. An image data source may include a display, a camera, a receiver module, a storage medium, or any other image data source known to one of ordinary skill in the art.

In one example, image data may be image data currently displayed on a display for a user. For example, suppose that smart glasses having the category recognition-based automatic image selecting apparatus 10 are transmitting in real time on a head-up display an augmented reality video that includes a real world in front of the user's eyes captured by a camera. In this example, when an augmented reality video is being displayed on a display for a user, the image receiver 11 may receive a still image from the augmented reality video data.

In another example, the image data may be image data captured by a camera and received in real time. For example, suppose that smart glasses having the category recognition-based automatic image selecting apparatus 10 are transmitting in real time on a head-up display a video of the real world in front of the user's eyes captured by a camera. In this example, when the video captured by the camera is being displayed on a display for the user, the image receiver 11 may receive a still image from the video data.

In another example, the image data may be image data received from a remote location over a communication network. For example, suppose that a user who is wearing smart glasses having the category recognition-based automatic image selecting apparatus 10 is now watching a drama by receiving a digital multimedia broadcasting (DMB) program. In this example, the image receiver 11 may receive a still image from the DMB drama video data displayed on a head-up display of the smart glasses.

In another example, the image data may be training data stored in a local storage medium or a remote storage space. For example, suppose that a who is wearing smart glasses having the category recognition-based automatic image selecting apparatus 10 receives a picture or video relating to the user's favorite style of "flower-patterned clothes", which is stored in the user's personal account of a remote cloud, and makes the category recognition-based automatic image selecting apparatus 10 learn the picture or video relating to "flower-patterned clothes." In this example, the training data is stored in the user's personal account of a remote cloud, which includes images predetermined as belonging to "flower-patterned clothes" category. The image receiver 11 may receive, from the training data, images predetermined as belonging to the "flower-patterned clothes" category.

It needs to be determined to which specific category an image received by the image receiver 11 belongs. Reference data used for the determination is provided by the category identification reference data 13. The category identification reference data 13 includes at least one reference feature, which is a feature predetermined as belonging to a specific category.

A feature enables the category recognition-based automatic image selecting apparatus 10 to determine whether an image belongs to a specific category directly based on content of the image.

In general, categories may be defined using general concepts, such as, for example, human, animal, female, male, cat, pet, fashion, and car. Further, categories may be determined by mixing general concepts into a personally meaningful one, such as flower-patterned clothes and Lady Gaga.

The automatic image selecting apparatus 10 recognizes whether an image belongs to a specific category. In addition, the category recognition-based automatic image selecting apparatus 10 recognizes to which category an image belongs among a plurality of categories. A category recognized by the automatic image selecting apparatus 10 may be determined based on a category that is predetermined to be recognized by the category identification reference data 13 or by reference features included in the category identification reference data 13.

Reference features included in the category identification reference data 14 may be provided by one or more of various entities to recognize specific categories. The various entities may include a user, a relevant system provider, a relevant method software developer, and/or a third party. Assigning a specific feature to a specific category is a well-known technique in conventional image analysis technologies that enables recognition of an object, such as a specific person's face, from an image. In the following description, a particular feature predetermined as corresponding to a particular category is referred to as a "reference feature".

A reference feature may be a feature that is selected as a criterion for identifying a predetermined specific category from among a plurality of features previously extracted from an image. In this case, whether an image belongs to a specific category may be determined by comparing a feature extracted from the image with a reference feature.

A feature is a characteristic discovered from an image. The determination of which characteristic in an image corresponds to which feature may be made in advance by one of various entities. The various entities may include a user, a relevant system seller, a relevant method software developer, and/or a third party. Assigning a characteristic of an image to a specific feature is a well-known technique in conventional image analysis technologies of recognizing an object, such as a specific person's face, from an image.

For example, suppose that the automatic image selecting apparatus 10 recognizes a "flower-patterned clothes" category. In this case, as reference features, the category identification reference data 13 may include features that are used for recognizing the "flower-patterned clothes" category. For example, suppose that "clothes and "flower" need to be recognized to recognize "flower-patterned clothes." In this case, as reference features, the category identification reference data 13 includes features for recognizing "clothes" and features for recognizing "flower."

The feature extractor 15 outputs a feature extracted from an image as an image feature. The image feature extracted by the feature extractor 15 may be composed of data having a same format as a reference feature, so that the data is comparable to the reference feature. In this case, it is possible to compare an image feature directly with a reference feature. The image feature and the reference feature may indicate the same category or different categories. In a case where the image feature and the reference feature match each other, the image feature and the reference feature are determined to indicate the same category. However, in a case where the image feature and the reference feature are different from each other, the image feature and the reference feature are determined to indicate different categories.

The category determiner 17 compares an image feature and a reference feature and determines whether an image belongs to a desired category based on a result of the determination. A category indicated by a reference feature is a specific category predetermined to be recognized by the reference feature. The specific category may be a category of images a user wants to store.

For example, the category determiner 17 compares an image feature and a reference feature, and if the image feature matches the reference feature, the category determiner 17 determines that both the image feature and the reference feature indicate the same category and that a corresponding image's category is therefore a specific category of images a user wants to store. Alternatively, the category determiner 17 compares an image feature and a reference feature, and, if the image feature is different from the reference feature, the category determiner 17 determines that the image feature and the reference feature indicate different categories, and that a corresponding image's category is therefore not a specific category of images a user wants to store.

The following description includes examples in which category identification reference data includes a reference feature, and the reference feature is a kind of feature that can be extracted from an image. However, aspects of the present disclosure are not limited thereto. For example, instead of a reference feature, the category identification reference data 13 may include any other various reference data for identifying a specific category. In this case, the category determiner 17 may use the category identification reference data to determine a category of a feature extracted from an image. The category identification reference data 13 is not limited as long as it makes it possible to identify whether a specific feature indicates a specific category. For example, the category identification reference data may be data that is used for identifying characteristics included in a feature and determining whether the identified features are able to be identified as the specific category.

Therefore, although the category determiner 17 is descried in the following description to "compare" a reference feature from the category identification reference data 13 and a feature extracted from an image, it is to be understood that the term "compare" is not limited to simple comparison between features. In other words, comparing a reference feature and a feature extracted from an image include various methods of determining the feature extracted from the image based on various category identification reference data that are able to recognize specific categories.

The operation controller 19 outputs a control signal that controls an operation associated with storage of an image according to a determination made by the category determiner 17. A control signal output by the operation controller 19 may be one of control signals that cause an image to be stored in a local and/or remote storage medium. A local storage medium may be a memory that is, for example, included in smart glasses having the automatic image selecting apparatus 10. A remote storage medium may be a storage space within a smart phone, a tablet, a laptop computer, or a remote cloud server, each of which is, for example, connected over a communication network to smart glasses having the automatic image selecting apparatus 10.

The automatic image selecting apparatus 10 described above with reference to FIG. 1 provides a method of automatically selecting and storing an image. For example, in a case where a user is wearing smart glasses having the automatic image selecting apparatus 10, an image belonging to a specific category meaningful for the user may be stored in a local memory in the smart glasses. The user may upload an automatically selected image to be stored in a storage of the user's personal account in the cloud connected over a communication network, such as the Internet. Thus, when the user is walking through crowds or shopping, the automatic image selecting apparatus 10 enables that only images having desired content among images continuously captured by a camera of the smart glasses are automatically selected and processed, for example, stored.

Figure 2:
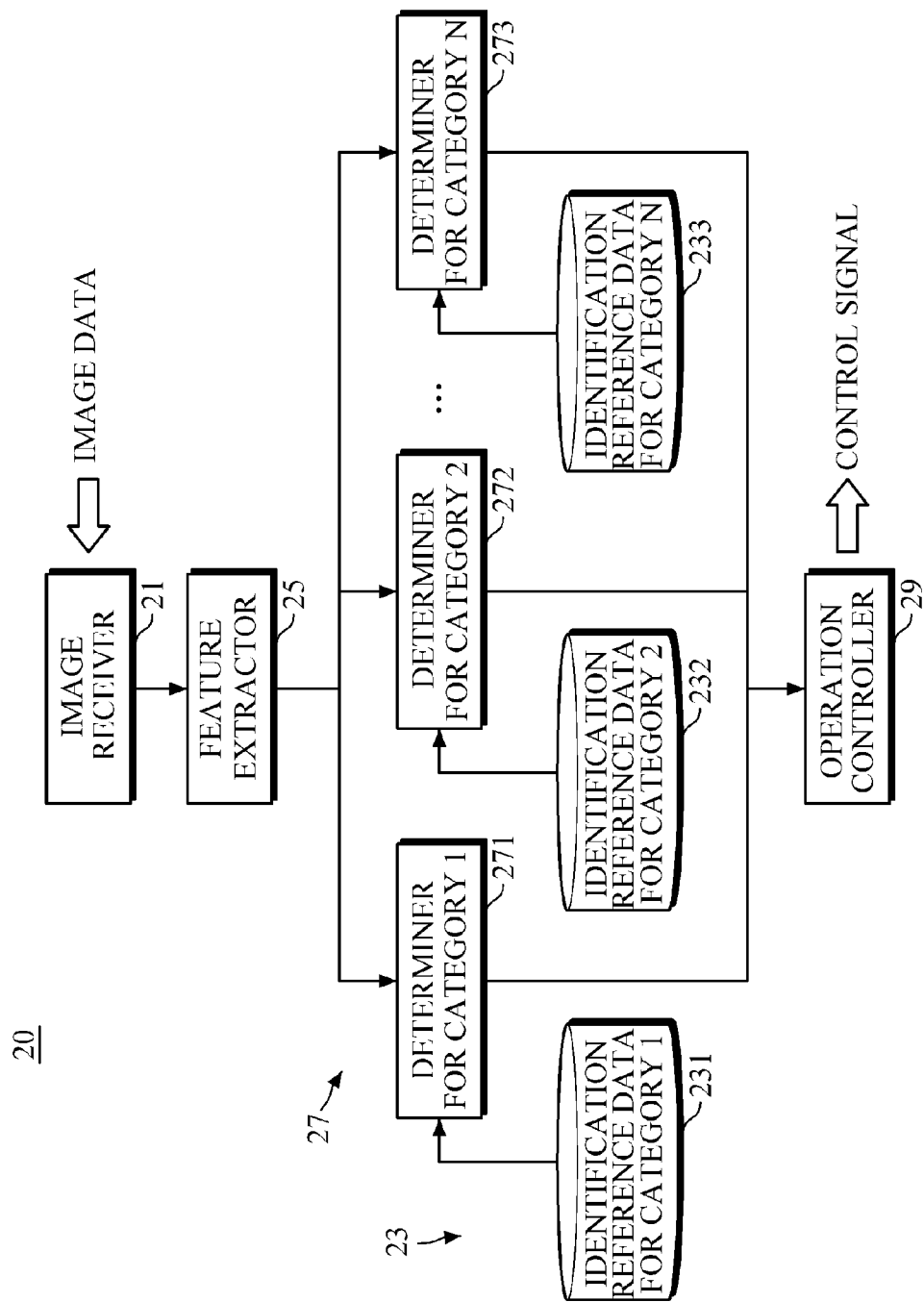
FIG. 2 illustrates another example of an automatic image selecting apparatus.

FIG. 2 illustrates another example of an automatic image selecting apparatus.

An automatic image selecting apparatus 20 illustrated in FIG. 2 recognizes and selects a plurality of categories to be stored.

Referring to FIG. 2, the automatic image selecting apparatus 20 includes an image receiver 21, category identification reference data 23 that includes identification reference data 231, 232, and 233 for different categories, a feature extractor 25, a category determiner 27 that includes category determiners 271, 272, and 273 for different categories respectively corresponding to the identification reference data 231, 232, and 233, and an operation controller 29.

Like the image receiver 11 shown in FIG. 1, the image receiver 21 is a component for receiving a specific image from received image data.

It needs to be determined to which category an image received by the image receiver 21 belongs. Reference data used for the determination is provided by the category identification reference data 23.

Despite the similarities, the identification reference data 23 is different from the category identification reference data 13 shown in FIG. 1 in that the identification reference data 23 includes a plurality of identification reference data 231, 232, and 233, each of which is for a different category. The first identification reference data 231 for category 1 includes reference features that are predetermined to recognize a specific category, that is, "Category 1." The second identification reference data 232 for category 2 includes reference features that are predetermined to recognize another specific category, that is, "Category 2". Likewise, the N-th identification reference data 233 for category N includes reference features that are predetermined to recognize another specific category, that is, "Category N." Herein, N donates an integer equal to or greater than 2. Thus, the category identification reference data 23 includes category identification reference data that are predetermined for two or more different respective categories.

Like the feature extractor 15 shown in FIG. 1, the feature extractor 25 extracts a feature from an image and outputs the extracted feature as an image feature. The image feature extracted by the feature extractor 25 may be composed of data having same format as a reference feature included in the category identification reference data 23, so that it is possible to compare the data with the reference feature.

Despite the similarities, the category determiner 27 is different from the category determiner 17 of FIG. 1 in that the category determiner 27 includes a plurality of category determiners 271, 272, and 273 for recognizing different respective categories. The first determiner 271 for category 1 determines whether a category of an image is "Category 1" based on the first identification reference data 231. The second determiner 272 for category 2 determines whether a category of an image is "Category 2" based on the second identification reference data 232. The N-th determiner 273 for category N determines whether a category of an image is "Category N" based on the N-th identification reference data. Herein, N denotes an integer equal to or greater than 2. Thus, the category determiner 27 determines whether a category of an image belongs to two or more different categories.

Like the operation controller 19 shown in FIG. 1, the operation controller 29 outputs a control signal that controls an operation associated with storage of an image according to a determination of the category determiner 27.

Figure 3:
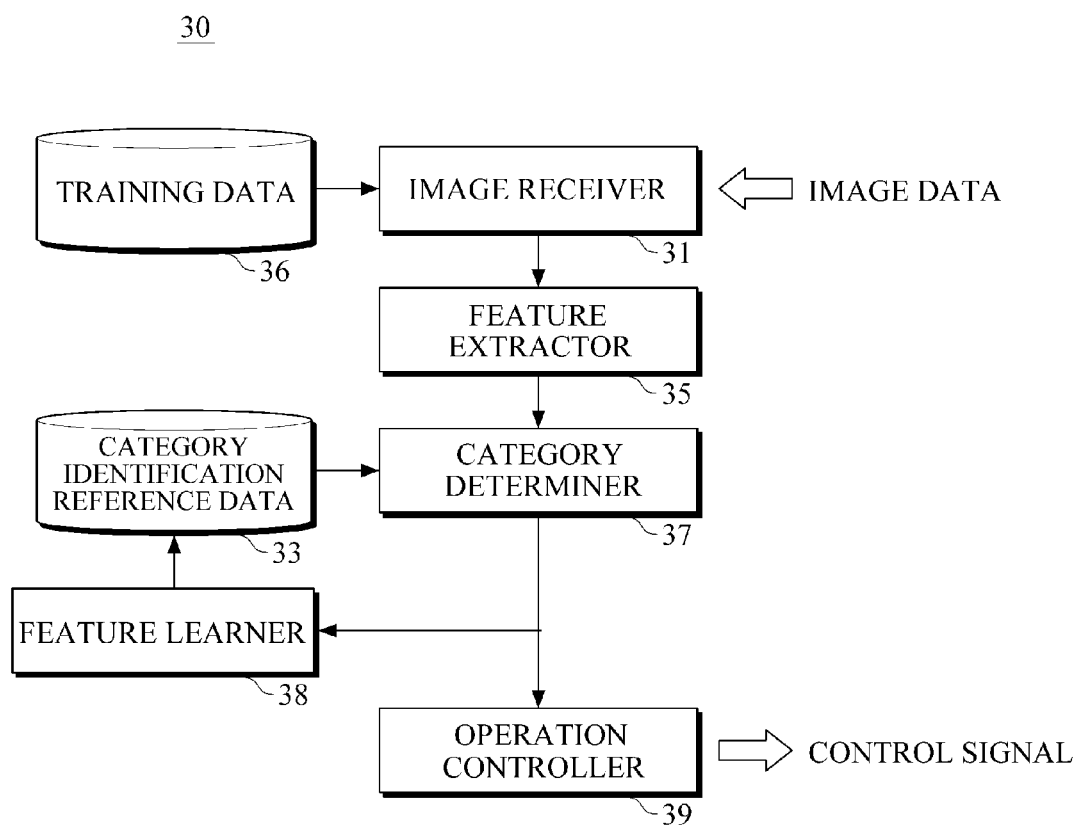
FIG. 3 illustrates another example of an automatic image selecting apparatus.

FIG. 3 illustrates another example of an automatic image selecting apparatus.

An automatic image selecting apparatus 30 illustrated in FIG. 3, which is an example of a variation of the automatic image selecting apparatus shown in FIG. 1, refines a category recognition function by updating category identification reference data using training data.

Referring to FIG. 3, the automatic image selecting apparatus 30 includes an image receiver 31, category identification reference data 33, a feature extractor 35, training data 36, a category determiner 37, a feature learner 38, and an operation controller 39.

Like the image receiver 11 shown in FIG. 1, the image receiver 31 receives a specific image from received image data.

It needs to be determined whether an image received by the image receiver 31 belongs to a specific category. Reference data used for the determination is provided by the category identification reference data 33.

In addition, a category of an image received by the image receiver 31 may have been defined in advance. The training data 36 is a group of images that are classified in a specific category. The training data 36 may be images stored by a user in a local memory, a storage space of the user's computing device, or a storage space of the user's personal account of a remote cloud. Whether the images in the training data 36 belong to a specific category may be determined by the user.

Like the category identification reference data 13 shown in FIG. 1, the category identification reference data 33 include data, such as a reference feature, that is predetermined to recognize a specific category.

Like the feature extractor 15 of FIG. 1, the feature extractor 35 extracts a feature from an image and outputs the extracted feature as an image feature.

Like the category determiner 17 of FIG. 1, the category determiner 37 compares the image feature with data included in the category identification reference data 33, that is, a reference feature, and determines whether the category of the image is matched to a desired category.

The feature learner 33 updates the category identification reference data 33 based on a determination made by the category determiner 37 as to the images included in the training data 36. For example, in a case where the category determiner 37 determines that an image feature extracted from an image received from the training data 36 matches a reference feature included in the category identification reference data 33, the feature learner 33 does not update the category identification reference data 33. Alternatively, in a case where the category determiner 37 determines that an image feature extracted from an image received from the training data 36 does not match a reference feature included in the category identification reference data 33, the feature learner 33 updates the category identification reference data 33 based on the image feature. For example, the feature learner 33 may update the category identification reference data 33 by adding the image feature to the category identification reference data 33.

Like the operation controller 19 of FIG. 1, the operation controller 39 outputs a control signal that controls an operation associated with storage of the image according to a determination made by the category determiner 37.

Hereinafter, examples of computing devices having an automatic image selecting apparatus are described with reference to FIGS. 4 to 7. However, computing devices described in the following examples are merely exemplary. It will be apparent to one of ordinary skill in the art that a single computing device and/or a dispersed computing environment with various combinations fall within the scope of the claims and their equivalents.

Figure 4:
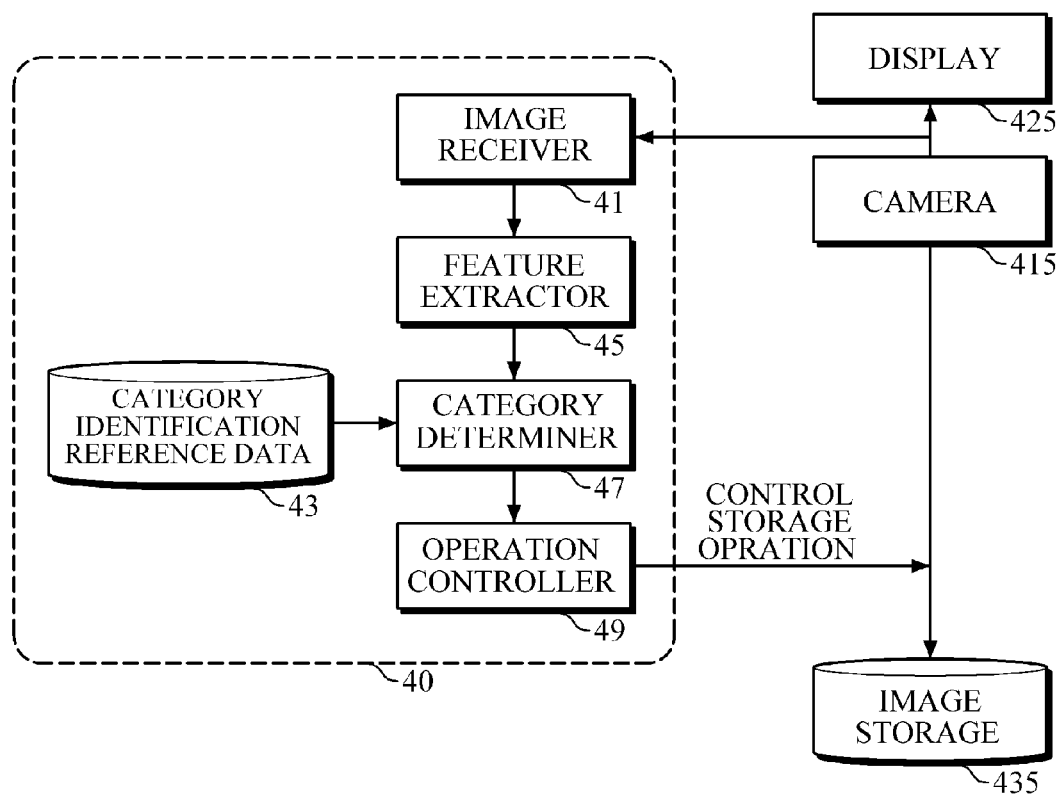
FIG. 4 illustrates an example of a computing device including an automatic image selecting apparatus.

FIG. 4 illustrates an example of a computing device having an automatic image selecting apparatus.

Referring to FIG. 4, there is provided a computing device 400 having an automatic image selecting apparatus 40. In FIG. 4, the computing device 400 includes the automatic image selecting apparatus 40, a camera 415, a display 425, and a local image storage 435. The automatic image selecting apparatus 40 includes an image receiver 41, category identification reference data 43, a feature extractor 45, a category determiner 47, and an operation controller 49 that correspond to the components of the system shown in FIG. 1.

In a path in which an image captured by the camera 415 is being provided to the display, the image receiver 41 receives the image. The feature extractor 45 extracts a feature from the received image. The extracted feature is provided to the category determiner 47 as an image feature. The category determiner 47 compares the image feature with a reference feature included in the category identification reference data 43. The category identification reference data 43 includes one or more reference features that are predetermined to recognize a predetermined specific category. Thus, the category determiner 47 determines whether the received image belongs to the predetermined specific category. Only when the category determiner 47 determines that the receive image belongs to a category defined by the category identification reference data 43, the operation controller 49 outputs a control signal that enables transmission of the received image from the camera 415 to be stored in the image storage 435.

In this manner, while displaying the image captured by the camera 415 on the display 425, the computing device 400 illustrated in FIG. 4 is able to store in the image storage 435 only images selected through a category recognizing process.

Figure 5:
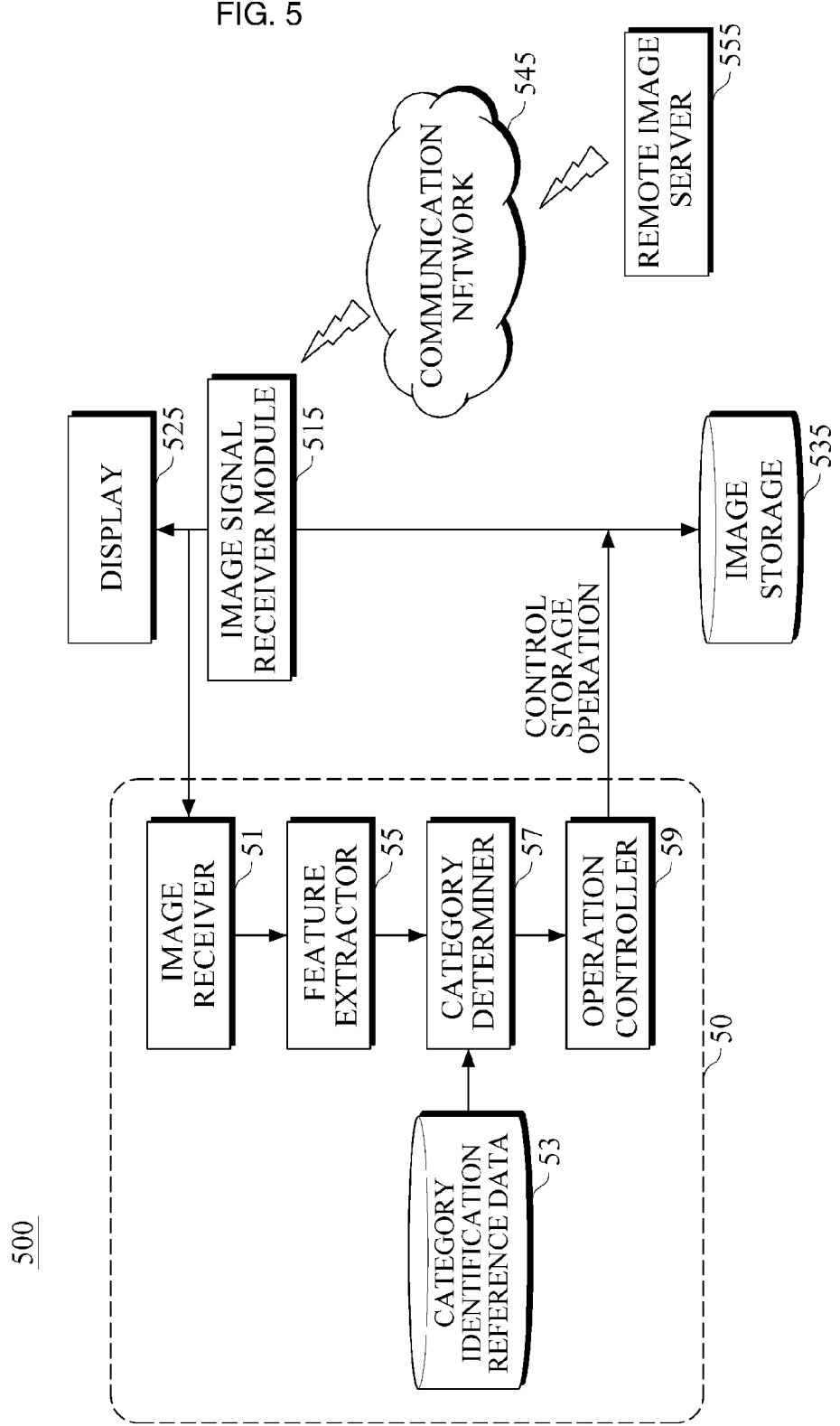
FIG. 5 illustrates another example of a computing device including an automatic image selecting apparatus.

FIG. 5 illustrates another example of a computing device having an automatic image selecting apparatus.

Referring to FIG. 5, there are provided a computing device 500 having an automatic image selecting apparatus 50 and a dispersed computing environment in which a remote image server 555 is connected over a communication network 545. In FIG. 5, the computing device 500 includes the automatic image selecting apparatus 50, an image signal receiver module 515, a display 525, and a local image storage 535. The automatic image selecting apparatus 50 includes an image receiver 51, category identification reference data 53, a feature extractor 55, a category determiner 57, and an operation controller 59 that correspond to the components of the system shown in FIG. 1.

In a path in which an image received by the image signal receiver module 515 is being provided to the display 525, the image receiver 51 receives the image. In this example, the image signal receiver module 515 receives the image from the remote image server 555 over the communication network 545. The feature extractor 55 extracts a feature from the received image. The extracted feature is provided to the category determiner 57 as an image feature. The category determiner 57 compares the image feature with a reference feature included in the category identification reference data 53. The category identification reference data 53 includes one or more reference features that are predetermined to recognize a predetermined specific category. Thus, the category determiner 57 determines whether the received image belongs to the predetermined specific category. Only when the category determiner 57 determines that the received image belongs to a category defined by the category identification reference data 53, the operation controller 59 outputs a control signal that enables transmission of the received image from the image signal receiver module 515 to be stored in the image storage 535.

In this manner, while displaying DMB images received from the remote image server 555, for example, a broadcasting server, on the display 525 for a user, the computing device 500 shown in FIG. 5 stores in the image storage 535 only images selected through a category recognizing process.

Figure 6:
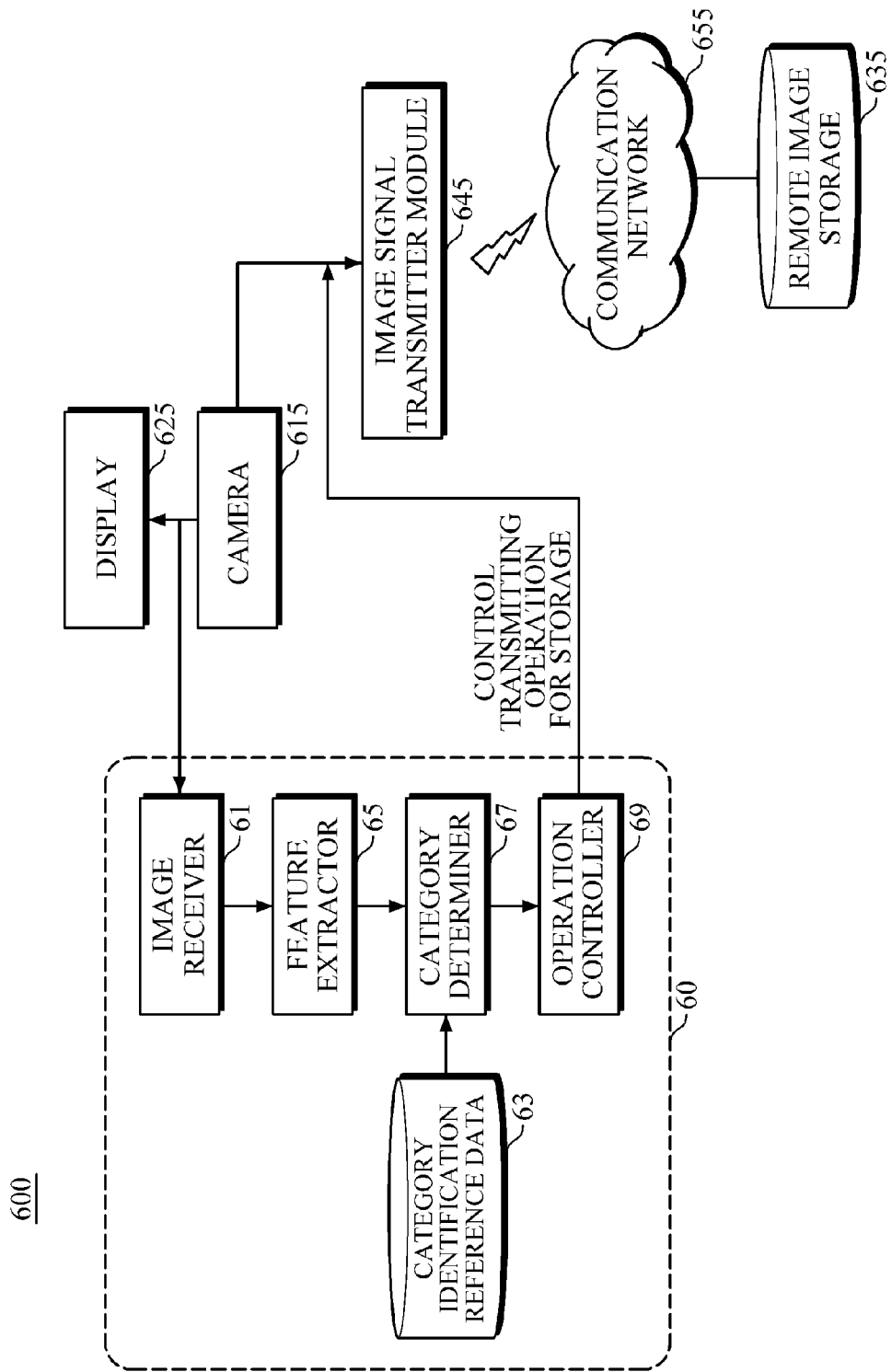
FIG. 6 illustrates another example of a computing device including an automatic image selecting apparatus.

FIG. 6 illustrates another example of a computing device having an automatic image selecting apparatus.

Referring to FIG. 6, there are provided a computing device 500 having an automatic image selecting apparatus 60, and a dispersed computing environment in which a remote image storage 635 is connected over a communication network 655. In FIG. 6, the computing device 600 includes the automatic image selecting apparatus 60, a camera 615, a display 625, and an image signal transmitter module 645. The automatic image selecting apparatus 60 includes an image receiver 61, category identification reference data 63, a feature extractor 65, a category determiner 67, and an operation controller 69 that correspond to the components of the system shown in FIG. 1.

In a path in which the image captured by the camera 615 is being provided to the image display 625, the image receiver 61 receives the image. The feature extractor 65 extracts a feature from the received image. The extracted feature is provided to the category determiner 67 as an image feature. The category determiner 67 compares the extracted feature with a reference feature included in the category identification reference data 63. The category identification reference data 63 includes one or more reference features that are predetermined to recognize a predefined specific category. Thus, the category determiner 67 determines whether the received image belongs to the predetermined specific category. Only when the category determiner 67 determines that the image belongs to a category defined by the category identification reference data 63, the operation controller 69 outputs a control signal that enables transmission of the received image from the camera 615 to be stored in the remote image storage 635. In accordance with the control signal, the image is provided from the camera 615 to the image signal transmitter module 645. The image signal transmitter module 645 converts the image into a communication signal and transmits the communication signal to the remote image storage 635 over the communication network 655 so that the image is stored in the remote image storage 635.

In this manner, while displaying an image captured by the camera 615 on the display 535 for a user, the computing device 600 shown in FIG. 6 stores in the remote image storage 635 only images selected through a category recognizing process. For example, the remote image storage 635 may be a storage space allocated to the user's personal account in a remote cloud server.

Figure 7:
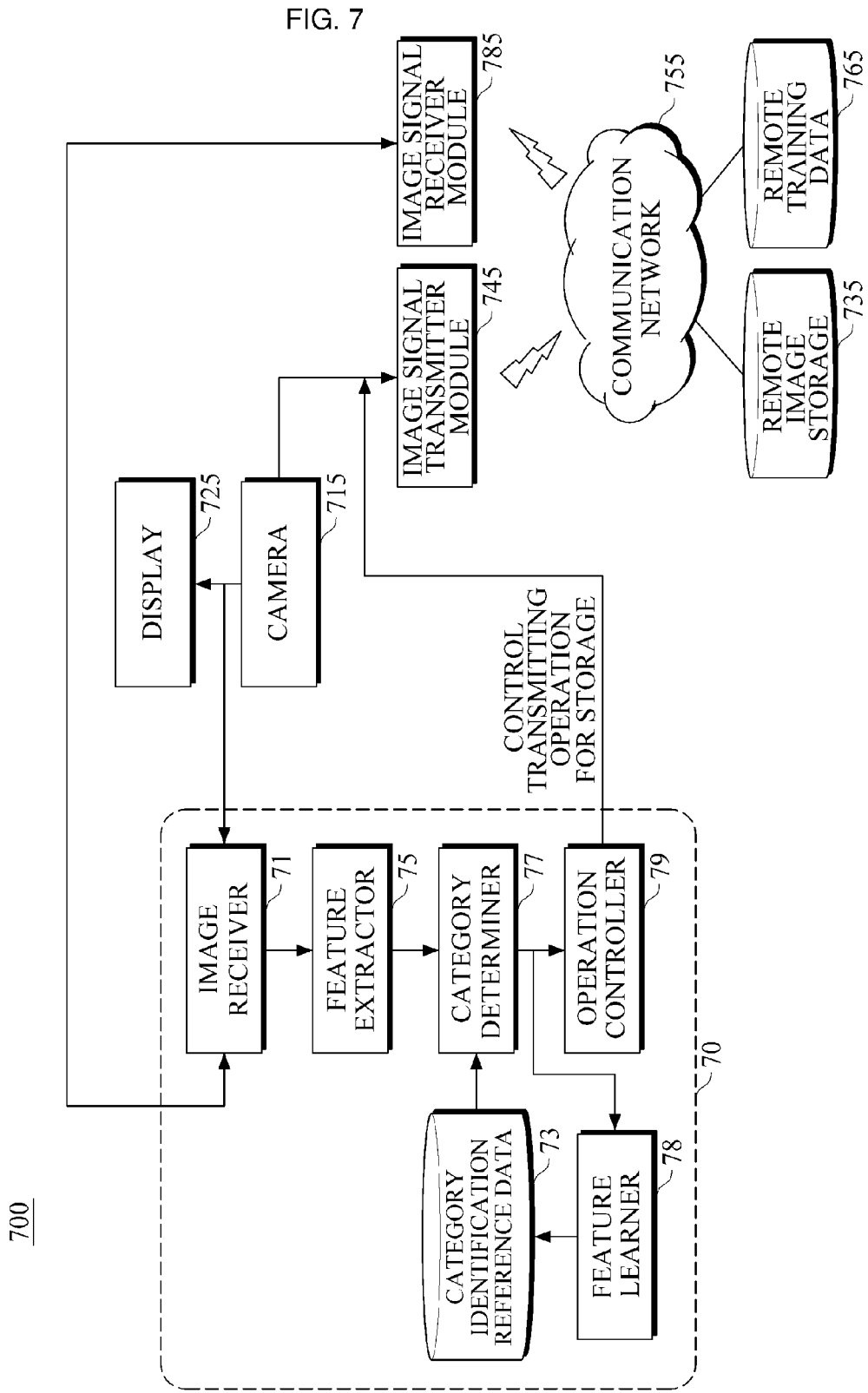
FIG. 7 illustrates another example of a computing device including an automatic image selecting apparatus.

FIG. 7 illustrates another example of a computing device having an automatic image selecting apparatus.

Referring to FIG. 7, there are illustrated a computing device 700 having an automatic image selecting apparatus 70, and a dispersed computing environment in which remote training data 765 and a remote image storage 735 are connected over a communication network 755. In FIG. 7, the computing device 700 includes the automatic image selecting apparatus 70, a camera 715, a display 725, an image signal transmitter module 745, and an image signal receiver module 785. The automatic image selecting apparatus 70 includes an image receiver 71, category identification reference data 73, a feature extractor 75, a category determiner 77, a feature learner 78, and an operation controller 79 that correspond to the components of the system shown in FIG. 1.

The automatic image selecting apparatus 70 has two operational modes, that is, a selecting mode and a learning mode. In the selecting mode, the automatic image selecting apparatus 70 determines whether to store a received image by recognizing a category thereof. In the learning mode, the automatic image selecting apparatus 70 receives an image from training data, and updates the category identification reference data 73 using a feature extracted from the received image. An operational mode of the automatic image selecting apparatus 70 may be set by a user between the selecting mode and the learning mode.

In the selecting mode, in a path in which an image captured by the camera 715 is being provided to the display 725, the image receiver 71 receives the image. The feature extractor 75 extracts a feature from the received image. The extracted feature is provided to the category determiner 77 as an image feature. The category determiner 77 compares the image feature with a reference feature included in the category identification reference data 73. The category identification reference data 73 includes one or more reference features that are predetermined to recognize a specific predetermined category. Thus, the category determiner 77 is able to determine whether the received image belongs to a category defined in the category identification reference data 73. Only when the category identification reference data 73 determines that the received image belongs to a category defined in the category identification reference data 73, the operation controller 79 outputs a control signal that enables transmission of the received image from the camera 715 to be stored in the remote image storage. In accordance with the control signal, the image is provided from the camera 715 to the image signal transmitter module 745. The image signal transmitter module 745 converts the image into a communication signal and transmits the communication signal to the remote image storage 735 so that the image is stored in the remote image storage 735.

In the learning mode, the automatic image selecting apparatus 70 assumes that a received image is an image received from training data whose category is defined. In FIG. 7, the image receiver 71 receives an image from image data received by the image signal receiver module 785. The image signal receiver module 785 receives the image data from the remote training data 765 connected over the communication network 755. The feature extractor 75 extracts a feature from the received image. The extracted feature is provided to the category determiner 77 as an image feature. The category determiner 77 compares the image feature with a reference feature included in the category identification reference data 73.

In this case, the reference feature included in the category identification reference data 73 is predetermined to recognize a specific category. In addition, the image feature is predetermined to recognize the specific category. Therefore, a reference feature and an image feature need to match each other in principle. However, the reference feature and the image feature may be different from each other in practice. This is because a reference feature is selected from a predetermined amount of reference image data, whereas training data may include a much greater volume of image data including more images not included in the reference image data. Thus, the category determiner 77 may determine whether a reference feature and an image feature match each other. When the category determiner 77 determine that a reference feature and an image feature match each other, the feature learner 78 updates the category identification reference data 73 by modifying the existing reference feature based on the image feature or by adding a new reference feature.

After the category identification reference data 73 are updated in the learning mode, the operational mode may be switched to the selecting mode. In the selecting mode after the learning mode, the updated category identification reference data 73 is used so that an image category recognizing process may be performed more efficiently.

Accordingly, the computing device 700 shown in FIG. 7 is able to improve the efficiency of the automatic image selecting apparatus 70 using the learning mode. For example, a user may install in the computing device 700 an application that is encoded to implement the automatic image selecting apparatus 70. Firstly, the user may instruct the automatic image selecting apparatus 70 to learn the user's own collected image data. Then, the user may implement the selecting mode for an image captured by the camera 715.

Figure 8:
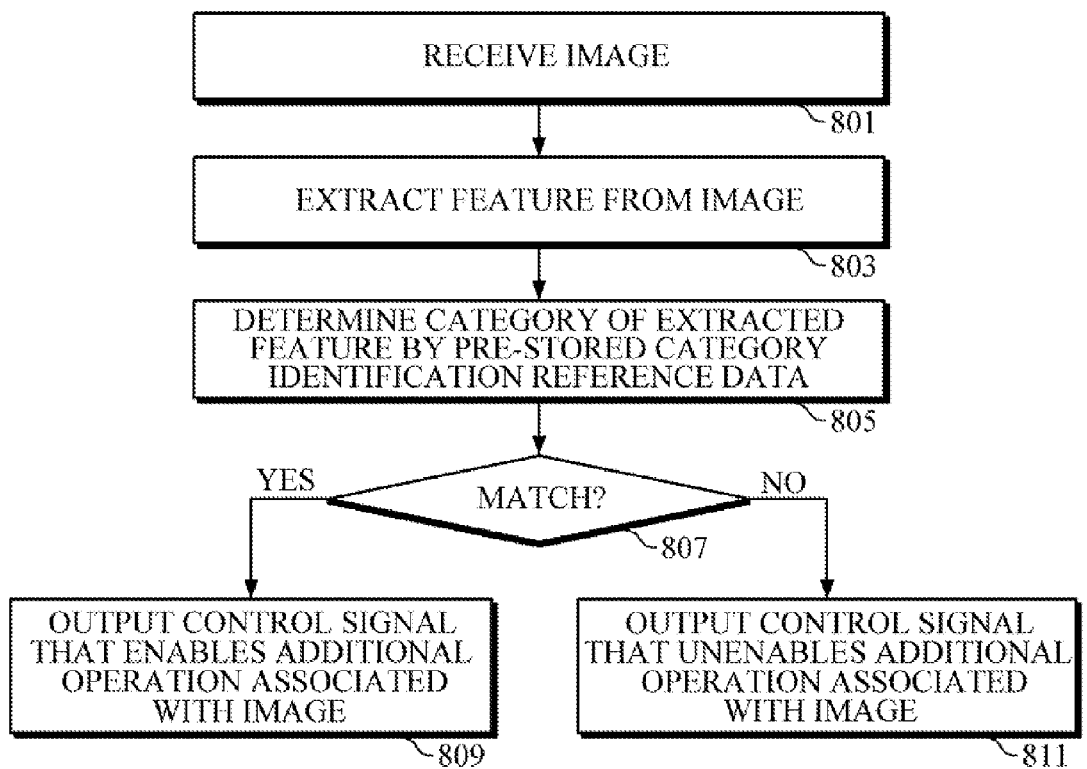
FIG. 8 illustrates an example of an automatic image selecting method.

FIG. 8 illustrates an example of an automatic image selecting method.

Referring to FIG. 8, an automatic image selecting method 800 includes a process of selectively storing an image by analyzing content of the image to recognize a category thereof.

Firstly, an image is received in 801. A feature is extracted from the received image in 803. In 805, a category of the extracted feature is determined based on pre-stored category identification reference data. In 807, it is determined whether the category of the extracted feature matches a specific category.

The category identification reference data are predetermined to recognize a specific category. Thus, if the extracted feature matches the category identification reference data, the category of the extracted feature is determined to match the specific category in 807. Alternatively, if the extracted feature does not match the category identification reference data, the category of the extracted feature is not to match the specific category in 807.

Accordingly, if the extracted feature matches the category identification reference data, a control signal enabling an additional operation associated with the image is output in 809. The additional operation associated with the image relates to storing the image. Thus, the image may be stored in accordance with the control signal enabling the additional operation. Alternatively, if the extracted feature does not match the category identification reference data, a control signal disabling the additional operation associated with the image is output in 811. Thus, the image may not be stored in accordance with the control signal.

Figure 9:
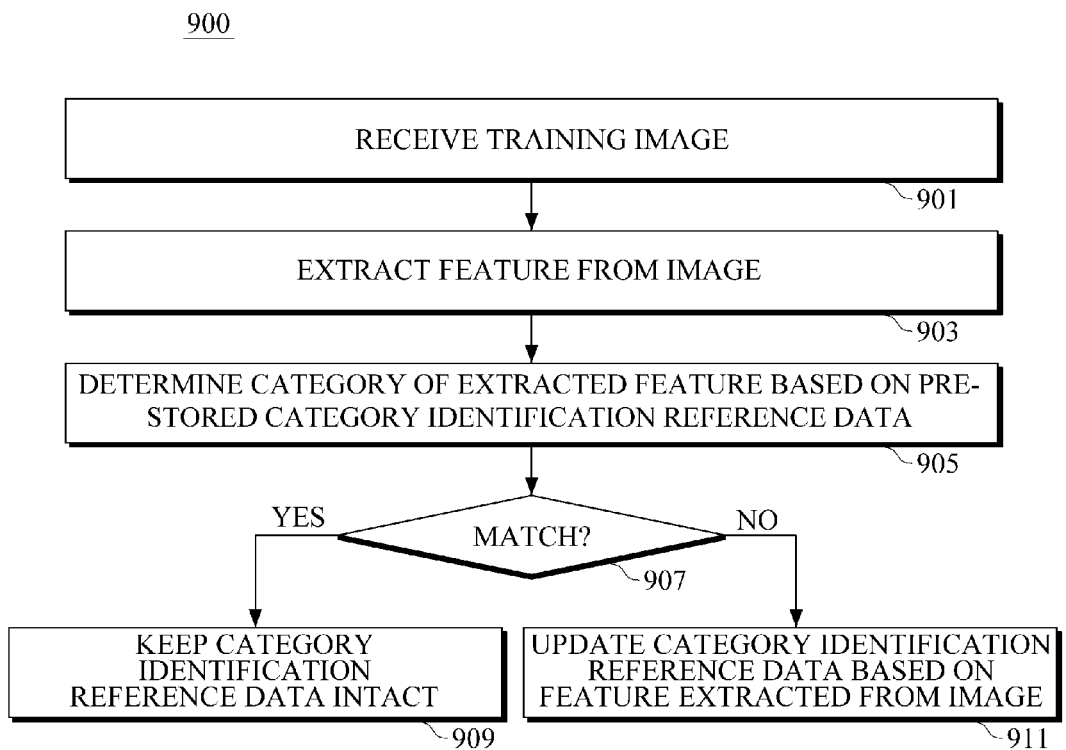
FIG. 9 illustrates another example of an automatic image selecting method.

FIG. 9 illustrates another example of an automatic image selecting method.

Referring to FIG. 9, an automatic image selecting method 900 includes a process of updating category identification reference data based on an image feature learned by recognizing a category of an image.

Firstly, a training data image is received in 901. A training data image is an image for which a user has predetermined a specific category. A feature is extracted from the received image in 903. The extracted feature is compared with pre-stored category identification reference data in 905. Then, whether the extracted feature matches the category identification reference data is determined in 907.

The feature extracted from the training data image is considered to recognize a specific category. In addition, the category identification reference data are considered to recognize the specific category. Thus, if the extracted feature matches the category identification reference data, a determination is made in 907 that the category identification reference data do not need to be modified by the extracted feature. Alternatively, if the extracted feature does not match the category identification reference data, a determination is made in 907 that the category identification reference data needs to be modified by the extracted feature.

Accordingly, if the extracted feature matches the category identification reference data, the category identification reference data is kept intact in 909. Alternatively, if the extracted feature does not match the category identification reference data, the category identification reference data are updated based on the extracted feature in 911. For example, the category identification reference data may be updated by adding the extracted feature to the category identification reference data. In another example, the category identification reference data may be updated by modifying some of the existing category identification reference data with reference to the extracted feature.

Figure 10:
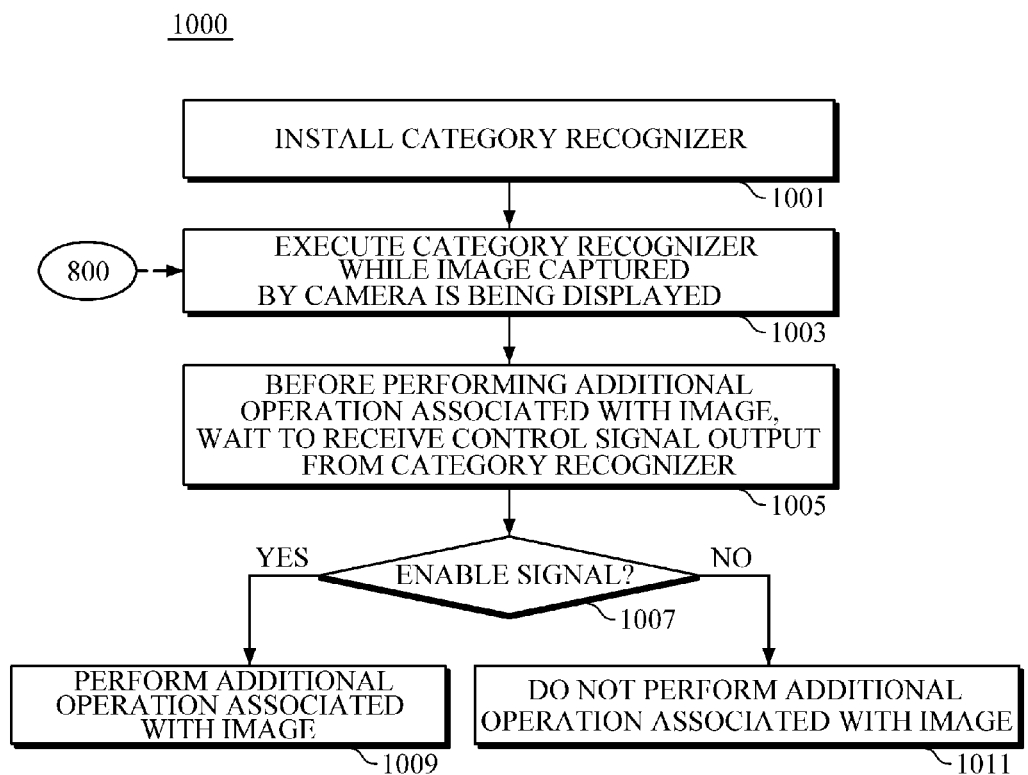
FIG. 10 illustrates another example of an automatic image selecting method.

FIG. 10 illustrates another example of an automatic image selecting method.

Referring to FIG. 10, an automatic image selecting method 1000 includes a process of selectively storing an image by executing a category recognizer to recognize a category of the image, wherein the category recognizer is an independent application that is installed in the smart glasses by a user.

Firstly, the user accesses a remote server using the smart glasses to download and install the category recognizer in the smart glass in 1001. Then, an image captured by a camera of the smart glasses is displayed on a head-up display of the smart glasses. In 1003, the user executes a category recognizer to automatically select an image belonging to a specific category among all displayed images and automatically store the selected image. Once the category recognizer is executed, a processor of the smart glasses waits in 1005 until the category recognizer outputs a control signal associated with storage of a specific image.

During the execution of the category recognizer in 1003, the category recognition-based automatic image selecting method 800 described above with reference to FIG. 8 is performed by the processor of the smart glasses. As a result, an image is received; a feature is extracted from the received image; the extracted feature is compared with a reference feature; and a control signal is output as described above with reference to FIG. 8. If the control signal output from the category recognizer is a signal enabling storage of a specific image (Yes in 1007), the processor of the smart glasses performs an additional operation associated with the received image, that is, an operation of storing the specific image, in 1009. Alternatively, if the control signal output from the category recognizer is a signal disabling storage of a specific image (No in 1007), the processor of the smart glasses does not perform an additional operation associated with the specific image, that is, an operation of storing the specific image, in 1011.

During the execution of the category recognizer in 1003, the process 800 and the operations 1005 to 1011 of waiting to receive a control signal and storing/not storing a specific image in accordance with the control signal are repeatedly performed with respect to a plurality of continuous images.

Figure 11:
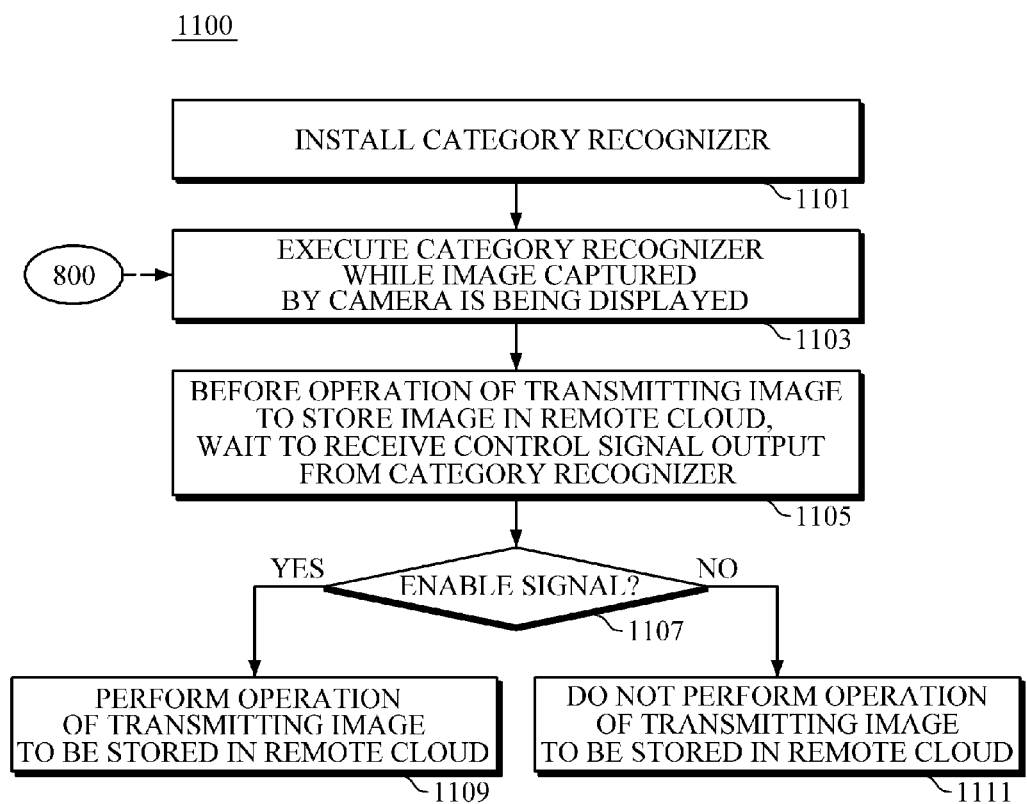
FIG. 11 illustrates another example of an automatic image selecting method.

FIG. 11 illustrates another example of an automatic image selecting method.

Referring to FIG. 11, an automatic image selecting method 1100 includes a process of selectively storing an image in a remote cloud by executing a category recognizer to recognize a categories of the image, wherein the category recognizer is an independent application that is installed in the smart glasses by a user.

Firstly, a user accesses a remote server using smart glasses to download and install a category recognizer in the smart glasses in 1101. Then, an image captured by a camera of the smart glasses is displayed on a head-up display of the smart glasses. In 1103, the user executes the category recognizer to automatically select an image belonging to a specific category among all displayed images and automatically store the image in a remote cloud. Once the category recognizer is executed, a processor of the smart glasses waits in 1105 until the category recognizer outputs a control signal associated with storage of a specific image in a remote cloud.

During the execution of the category recognizer in 1103, the automatic image selecting method 800 described above with reference to FIG. 8 is performed by the processor of the smart glasses. As a result, an image is received; a feature is extracted from the received image; a category of the extracted feature is determined based on category identification reference data; and a control signal is output. If the control signal output from the category recognizer is a signal enabling transmission of a specific image to be stored in a remote cloud (Yes in 1107), the processor of the smart glasses performs an additional operation associated with the specific image, that is, an operation of transmitting the specific image to be stored in the remote cloud, in 1109. Alternatively, if the control signal output from the category recognizer is a signal disabling transmission of a specific image to be stored in a remote cloud (No in 1107), the processor of the smart glasses does not perform an operation of transmitting the specific image to be stored in the remote cloud in 1111.

During the execution of the category recognizer in 1103, the process 800 and the operations 1105 to 1111 of waiting to receive a control signal and storing/not storing a specific image in accordance with the control signal are repeatedly performed with respect to a plurality of continuous images.

Figure 12:
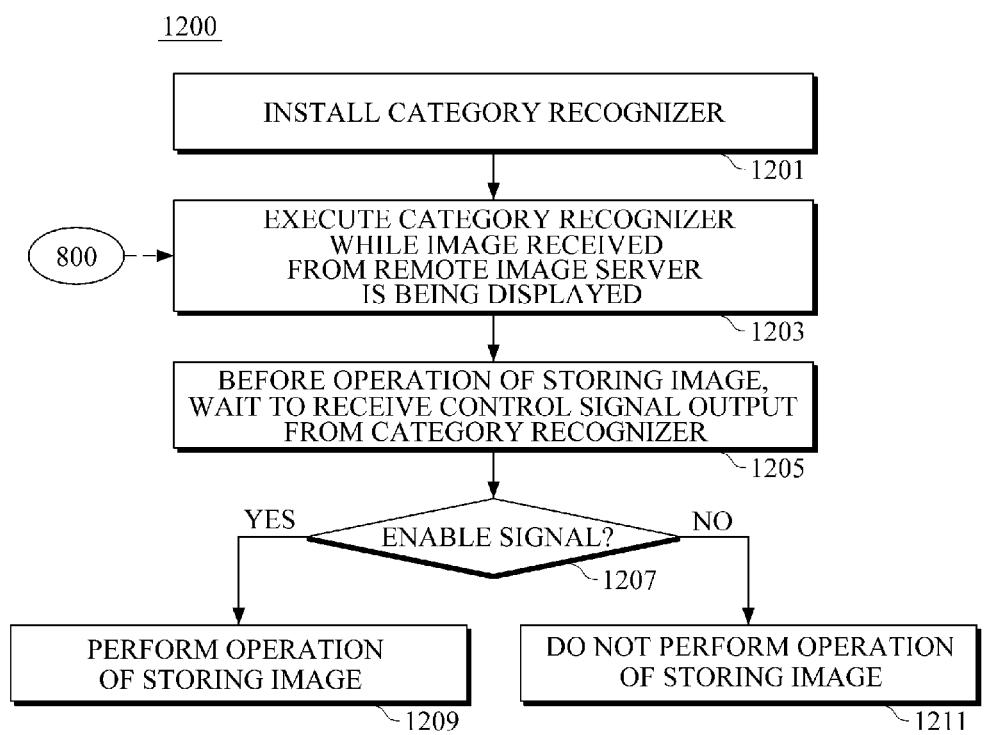
FIG. 12 illustrates another example of an automatic image selecting method.

FIG. 12 illustrates another example of a category recognition-based automatic image selecting method.

Referring to FIG. 12, an automatic image selecting method 1200 includes a process of selectively storing an image by executing a category recognizer to recognize a category of an image received from a broadcasting company, wherein the category recognizer is an independent application that is installed in smart glasses by a user.

Firstly, a user accesses a remote server using the smart glasses to download and install a category recognizer in the smart glasses in 1201. Then, a Digital Multimedia Broadcasting (DMB) image received by an image signal receiver module of the smart glasses from a remote image server is displayed on a head-up display of the smart glasses. In 1203, the user executes the category recognizer to automatically select an image belonging to a specific category among all displayed DMB images and automatically store the selected image. Once the category recognizer is executed, a processor of the smart glasses waits in 1205 until the category recognizer outputs a control signal associated with storage of a specific image.

During the execution of the category recognizer in 1203, the automatic image selecting method 800 described above with reference to FIG. 8 is performed by the processor of the smart glasses. As a result, an image is received; a feature is extracted from the received image; a category of the feature is determined based on category identification reference data; and a control signal is output. If the control signal output from the category recognizer is a signal enabling storage of a specific image (Yes in 1207), the processor of the smart glasses performs an additional operation associated with the specific image, that is, an operation of transmitting the specific image to the remote cloud for storage in 1209. Alternatively, if the control signal output from the category recognizer is a signal disabling storage of a specific image (No in 1207), the processor of the smart glasses does not perform an operation of transmitting the specific image to the remote cloud for storage in 1211.

During the execution of the category recognizer in 1203, the process 800 and the operations 1205 to 1211 of waiting to receive a control signal and storing or not storing a specific image in accordance with the control signal are repeatedly performed with respect to a plurality of continuous images.

Figure 13:
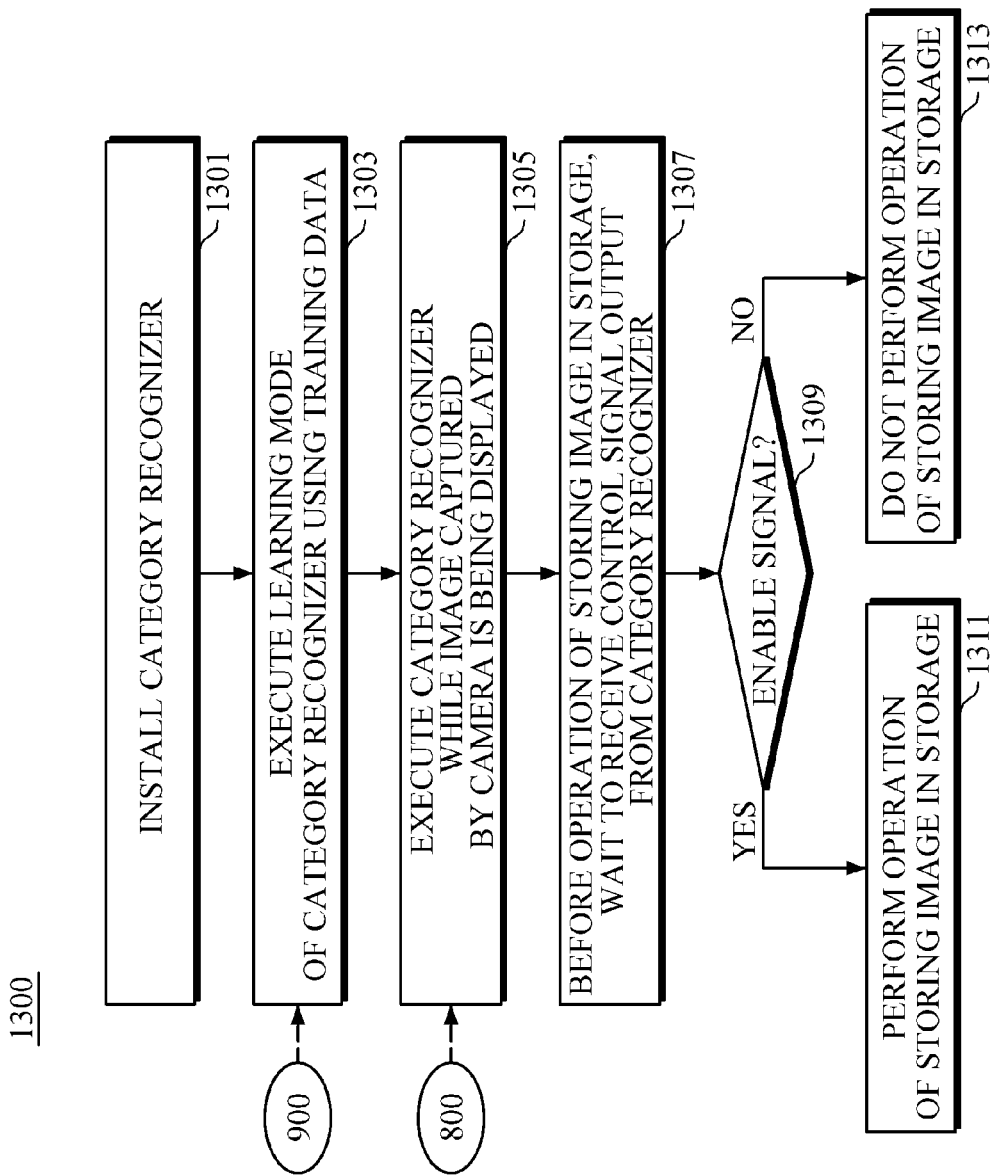
FIG. 13 illustrates another example of an automatic image selecting method.

FIG. 13 illustrates another example of an automatic image selecting method.

Referring to FIG. 13, an automatic image selecting method 1300 includes a process of selectively storing images by executing a category recognizer to recognize a category of an image captured by a camera, wherein the category recognizer is an independent application installed in the smart glasses by a user, and, before the execution of the category recognizer, the category recognizer is instructed to learn from the user's own collected images.

Firstly, a user accesses a remote server using the smart glasses to download and install a category recognizer in the smart glasses in 1301. In 1301, the user executes a learning mode of the category recognizer to instruct the category recognizer to learn from training data.

The training data may be images collected by the user. The training data may be images stored in a local memory of the smart glasses. The training data may be stored in a remote cloud. In the learning mode, the category recognizer considers any received image to belong to a specific category. Thus, features extracted from an image received from the training data are also considered to be predetermined to recognize the specific category.

During the execution of the learning mode in 1303, a the automatic image selecting method 900 described above with reference to FIG. 9 is performed by a processor of the smart glasses. As a result, category identification reference data included in the category recognizer may be updated.

Then, an image captured by a camera of the smart glasses is displayed on a head-up display of the smart glasses. In 1305, the user executes the category recognizer to automatically select an image belonging to a specific category and automatically store the selected image. Once the category recognizer is executed, the processor of the smart glasses waits in 1307 until the category recognizer outputs a control signal associated with storage of a specific image.

During the execution of the category recognizer in 1305, the automatic image selecting method 800 described above with reference to FIG. 8 is performed by a processor of the smart glasses. As a result, an image is received; a feature is extracted from the received image; a category of the extracted feature is determined based on category identification reference data; and a control signal is output. If the control signal output from the category recognizer is a signal enabling storage of a specific image in a storage (Yes in 1309), the processor of the smart glasses performs an operation of storing the received image in the storage in 1311. Alternatively, if the control signal output from the category recognizer is a signal disabling storage of a specific image in a storage (NO in 1309), the processor of the smart glasses does not perform an operation of storing the received image in the storage in 1313.

During the execution of the category recognizer 1305, the process 800 and the operations 1307 to 1313 of waiting to receive a control signal and storing/not storing a specific image in a storage in accordance with the control signal are repeatedly performed with respect to a plurality of continuous images.

Figure 14:
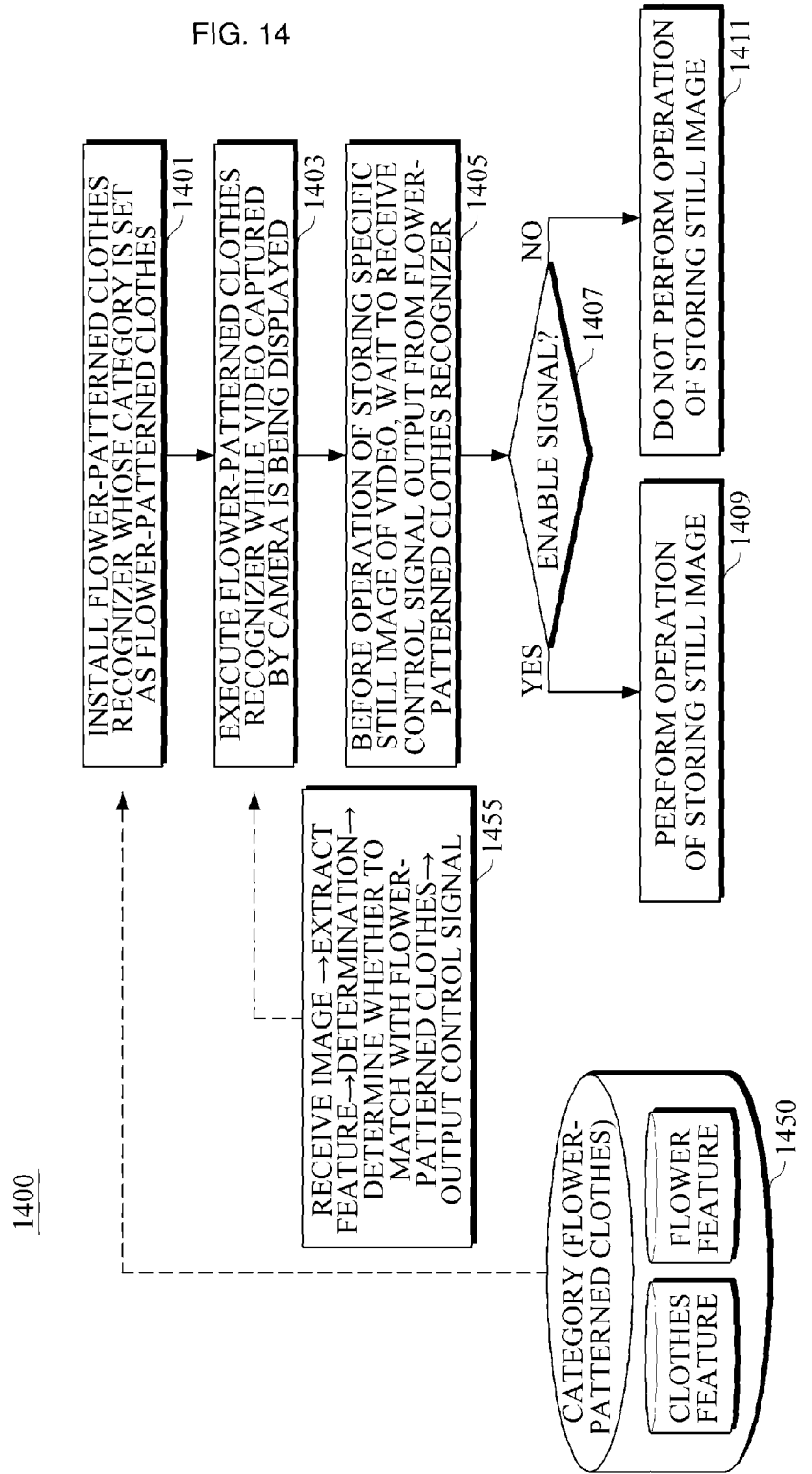
FIG. 14 illustrates another example of an automatic image selecting method.

FIG. 14 illustrates another example of an automatic image selecting method.

Referring to FIG. 14, an automatic image selecting method 1400 includes a process of selectively storing images by executing a flower-patterned clothes category recognizer to recognize whether a category of an image matches a "flower-patterned clothes" category, wherein the flower-patterned clothes category recognizer is an independent application that is installed in smart glasses by a user.

Firstly, the user accesses a remote server using the smart glasses to download and install a flower-patterned clothes recognizer that is set to recognize the "flower-patterned clothes" category among various categories in the smart glasses in 1401.

Category identification reference data 1450 of the flower-patterned clothes includes category identification reference data for recognizing flower-patterned clothes. In FIG. 14, the category identification reference data 1450 includes a "clothes feature", which is a reference feature for recognizing clothing, and a "flower feature", which is a feature for recognizing a flower. Each of the clothes feature and the flower feature may be a group of features. However, this is merely an example, and the category identification reference data 1450 may further include other reference features that are helpful in recognizing flower-patterned clothes. In addition, the category identification reference data 1450 may be refined by using personal images collected by the user as training data.

Then, an image captured by a camera of the smart glasses is displayed on a head-up display of the smart glasses. In 1403, the user executes the flower-patterned clothes recognizer to automatically select an image belonging to a flower-patterned clothes category among all displayed images and automatically store the selected image. Once the flower-pattern clothes recognizer is executed, a processor of the smart glasses waits in 1405 until the flower-patterned clothes recognizer outputs a control signal associated with storage of a specific image.

During the execution of the flower-patterned clothes recognizer in 1403, a process 1455, that is similar to the automatic image selecting method 800 described above with reference to FIG. 8, is performed by the processor of the smart glasses. As a result, an image is received; a feature is extracted from the received image; and a category of the extracted feature is determined based on the category identification reference data 1450. Then, whether the category of the received image matches the flower-patterned clothes category is determined, and a control signal is output according to a result of the determination. If the control signal output from the flower-patterned clothes recognizer is a signal enabling storage of a specific image (Yes in 1407), the processor of the smart glasses performs an operation of storing the specific image in 1409. Alternatively, if the control signal output from the flower-patterned clothes recognizer is a signal disabling storage of a specific image (No in 1407), the processor of the smart glasses does not perform an operation of storing the specific image in 1411.

During the execution of the flower-patterned clothes recognizer in 1403, the process 1455 and the operations 1405 to 1411 of waiting to receive a control signal and storing/not storing a specific image in accordance with the control signal are repeatedly performed with respect to a plurality of continuous images.

Figure 15:
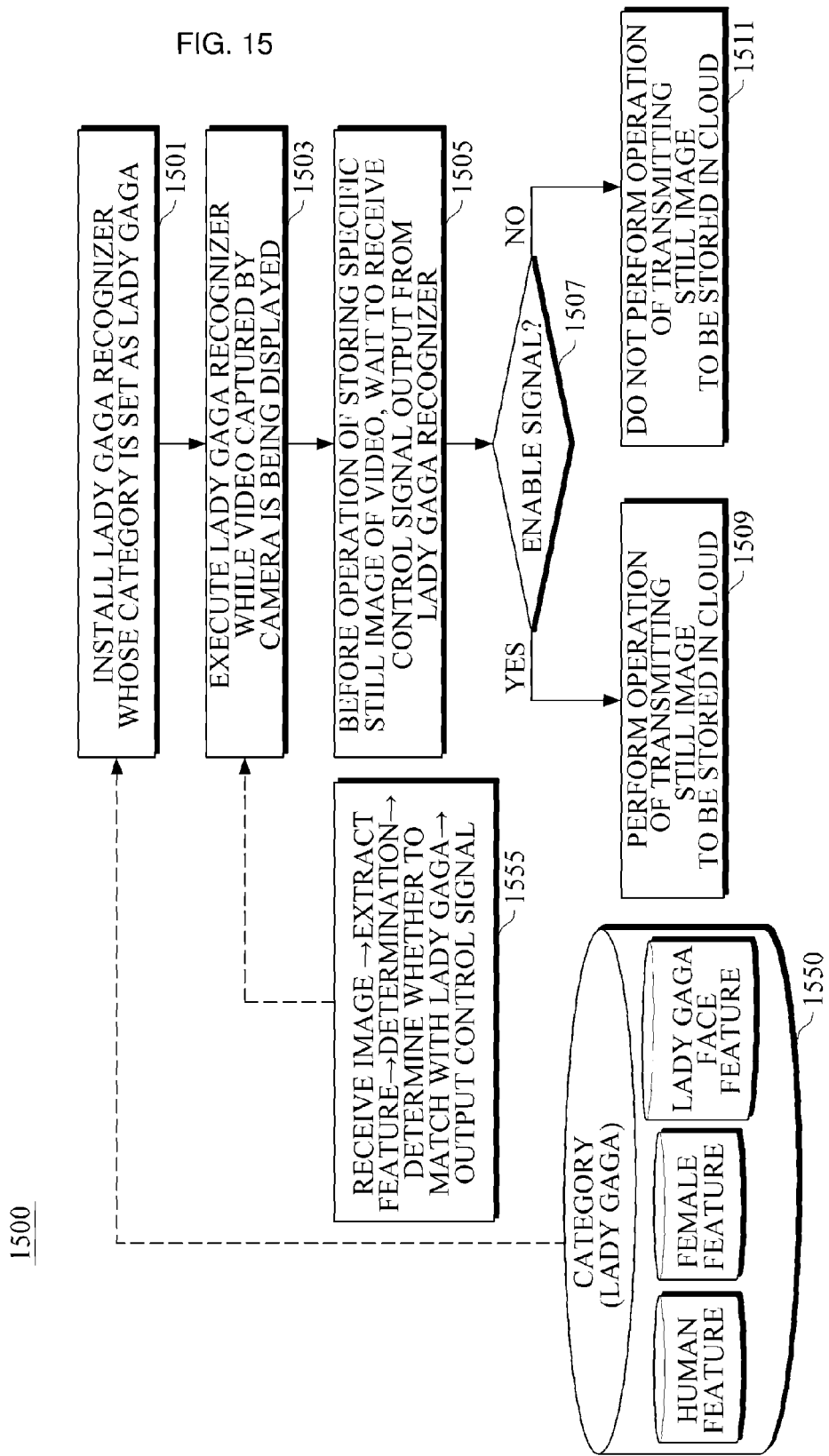
FIG. 15 illustrates another example of an automatic image selecting method.

FIG. 15 illustrates another example of a category recognition-based automatic image selecting method.

Referring to FIG. 15, the category recognition-based automatic image selecting method 1500 includes a process of selectively storing images by executing a Lady Gaga category recognizer to recognize whether a category of an image matches a "Lady Gaga" category, wherein the Lady Gaga category recognizer is an independent application installed by a user in smart glasses.

Firstly, the user accesses a remote server using the smart glasses to download and install the Lady Gaga recognizer, which is set to recognize the "Lady Gaga" category associated with one of the user's favorite celebrities among various categories, in the smart glasses in 1501.

Category identification reference data 1550 of the Lady Gaga recognizer includes reference features for recognizing the Lady Gaga category. In the example in FIG. 15, the category identification reference data 1550 includes a "human feature" enabling recognition of a human being, a "female feature" enabling recognition of a female, and a "Lady Gaga face feature" enabling recognition of a specific person, that is, Lady Gaga. Each of the human feature, the female feature, and the Lady Gaga face feature may be a group of features. However, this is merely an example, and the category identification reference data 1550 may further include other reference features that are helpful in recognizing Lady Gaga. In addition, the category identification reference data 1550 may be refined by learning personal images collected by the user as training data.

Then, an image captured by a camera of the smart glasses is displayed on a head-up display of the smart glasses. In 1503, the user executes the Lady Gaga recognizer to automatically select an image belonging to the Lady Gaga category among all displayed images and automatically store the selected image. Once the Lady Gaga recognizer is executed, a processor of the smart glasses waits in 1505 until the Lady Gaga recognizer outputs a control signal associated with storage of a specific image.

During the execution of the Lady Gaga recognizer in 1503, a process 1555, which is similar to the automatic image selecting method 800 described above with reference to FIG. 8, is performed by the processor of the smart glasses. As a result, an image is received; a feature is extracted from the received image; and a category of the extracted feature is determined based on the category identification reference data 1550. Then, whether a category of the received image matches the Lady Gaga category is determined, and a control signal is output according to a result of the determination. If the control signal output from the Lady Gaga recognizer is a signal enabling storage of a specific image (Yes in 1507), the processor of the smart glasses performs an operation of storing the specific image in 1509. Alternatively, if the control signal output from the Lady Gaga recognizer is a signal disabling storage of a specific image (No in 1507), the processor of the smart glasses does not perform an operation of storing the specific image in 1511.

During the execution of the Lady Gaga recognizer in 1503, the process 1555 and the operations 1505 to 1511 of waiting to receive a control signal and storing/not storing a specific image in accordance with the control signal are repeatedly performed with respect to a plurality of continuous images.

The above descriptions with reference to FIGS. 14 and 15 describe examples of a category recognizer that is predetermined to recognize a specific category. In these cases, a user may select one of the category recognizers predetermined to recognize a category most similar to a desired category and install the selected category recognizer in smart glasses. Then, the user instructs the installed category recognizer to learn images collected by the user, so that the installed category recognizer may be changed into the user's exclusive category recognizer that is able to recognize a category desired by the user.

In another example, a user may select a universal category recognizer that is not predetermined to recognize a specific category and install the selected universal category recognizer in smart glasses. Like in the above example, the user instructs the installed universal category recognizer to learn images collected by the user, so that the installed category recognizer may be changed into the user's exclusive category recognizer that is able to recognize a category desired by the user.

Components of the above-described automatic image selecting apparatuses may be implemented by a combination of components of a computing device, which may include a processor, a memory, a user inputting device, and a presentation device. The memory is a medium for storing computer-readable software, applications, program modules, routines, instructions, and data that are encoded to perform a specific task when executed by a processor. The processor may implement the computer-implementable software, the program modules, the routines, the instructions, and the data that are stored in the memory by reading the same from the memory and executing the same. The user inputting device may be a device that allows a user to input a command for instructing the processor to perform a specific task or to input data necessary for the specific task. The user inputting device may include a physical/virtual keyboard, a keypad, key buttons, a joystick, track ball, touch-sensitive inputting means, or a microphone. A presentation device may include a display, a printer, a speaker, or a vibration device.

In addition, the above-described automatic image selecting methods may be encoded as computer-implementable instructions that can be executed by a processor of a computing device. The computer implementable instructions may include software, applications, modules, procedures, plug-ins, programs, instructions, and/or data structures. The computer-implementable instructions may be stored in a computer-readable medium. Examples of the computer-readable medium include a non-transitory computer-readable storage medium and a computer-readable communication medium. Examples of the computer-readable storage medium include random-access memory (RAM), read-only memory (ROM), flash memory, an optical disk, a magnetic disk, a magnetic tape, a magnetic cassette, hard disks, and solid-state disks, An example of the computer-readable communication medium may be an encoded signal transmittable/receivable over a communication network obtained by encoding computer-implementable instructions for implementing a category recognition-based automatic image selecting method.

A computing device may be a device that includes a camera, a display, a processor, and a memory, and installs and implements an operating system and various applications to execute various functions. The computing device may include various devices, such as a smart watch, a smart phone, a tablet, a laptop, a desktop, a server, and a client. The computing device may be a single stand-alone device, or may include a plurality of computing devices that cooperate with one another over a communication network.

The automatic image selecting apparatuses described above with reference to FIGS. 1 to 7 are merely illustrative. It will be apparent to one of ordinary skill in the art in the art that different systems with various combinations are possible within the scope of the claims and their equivalents. Components of an automatic image selecting apparatus may be implemented by hardware including circuits executing respective functions. In addition, components of an automatic image selecting apparatus may be implemented by computer-implementable software, firmware, or hardware, or a combination of any two or more thereof, that can perform specific task when the components are operated by a processor of a computing device.

The automatic image selecting methods described above with references to FIGS. 8 to 15 are merely illustrative. It will be apparent to one of ordinary skill in the art that different methods with various combinations are possible within the scope of the claims and their equivalents. An automatic image selecting method may be encoded as computer-implementable instructions that can perform specific tasks when the computer-implementable instructions are executed by a processor of a computing device.

Such computer-implementable instructions may be provided in the form of an independent application-type category recognizer and then distributed to a user. The user may download the category recognizer over a communication network and install the category recognizer in a computing device, such as a smart phone, a smart watch, or smart glasses. Once the user executes the category recognizer, actions that implement an operation, a process, or a procedure included in an automatic image selecting method may be implemented by a processor of the computing device.

The image receiver 11, the category identification reference data 13, the feature extractor 15, the category determiner 17, and the operation controller 19 in FIG. 1; the image receiver 21, the category identification reference data 23, the identification reference data 231, 232, and 233 for different categories, the feature extractor 25, the category determiner 27, the category determiners 271, 272, and 273 for different categories, and the operation controller 29 in FIG. 2; the image receiver 31, the category identification reference data 33, the feature extractor 35, the training data 36, the category determiner 37, the feature learner 38, and the operation controller 39 in FIG. 3; the image receiver 41, the category identification reference data 43, the feature extractor 45, the category determiner 47, and the operation controller 49 in FIG. 4; the image receiver 51, the category identification reference data 53, the feature extractor 55, the category determiner 57, the operation controller 59, and the image signal receiver module 515 in FIG. 5; the image receiver 61, the category identification reference data 63, the feature extractor 65, the category determiner 67, the operation controller 69, and the image signal transmitter module 645 in FIG. 6; the image receiver 71, the category identification reference data 73, the feature extractor 75, the category determiner 77, the feature learner 78, the operation controller 79, he image signal transmitter module 745, and the image signal receiver module 785 in FIG. 7; and the automatic image selecting methods in FIGS. 8-15 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An automatic image selecting apparatus comprising:
an image receiver configured to receive an image;
a feature extractor configured to extract features from the image;
a category determiner configured to determine whether each of the extracted features matches predetermined category identification reference data of a category different from that of other of the extracted features used for determining whether to store the image; and
an operation controller configured to automatically store the image in response to the each of the features matching the predetermined category identification reference data.

2. The automatic image selecting apparatus of claim 1, wherein the image receiver is further configured to receive the image from image data currently displayed on a display for a user.

3. The automatic image selecting apparatus of claim 1, wherein the image receiver is further configured to receive the image from image data that are captured by and received from a camera.

4. The automatic image selecting apparatus of claim 1, wherein the image receiver is further configured to receive the image from image data received over a communication network.

5. The automatic image selecting apparatus of claim 1, wherein the image receiver is further configured to receive the image from training data comprising images that are predetermined to recognize a specific category; and
the automatic image selecting apparatus further comprises a feature learner configured to update the predetermined category identification reference data in accordance with a determination made by the category determiner.

6. The automatic image selecting apparatus of claim 1, wherein the predetermined category identification reference data comprises a plurality of category identification reference data, each of which is predetermined to recognize a different category.

7. The automatic image selecting apparatus of claim 1, wherein the operation controller is further configured to output a control signal to control an operation of storing the image in a local storage medium.

8. The automatic image selecting apparatus of claim 1, wherein the operation controller is further configured to output a control signal to control an operation of transmitting the image to a remote storage medium over a communication network and storing the image in the remote storage medium.

9. An automatic image selecting method comprising:
receiving an image;
extracting features from the image;
determining whether each of the extracted features matches predetermined category identification reference data of a category different from that of other of the extracted features used for determining whether to store the image; and
automatically storing the image in response to the each of the features matching the predetermined category identification reference data.

10. The automatic image selecting method of claim 9, wherein the receiving of an image comprises receiving the image from image data currently displayed on a display for a user.

11. The automatic image selecting method of claim 9, wherein the receiving of an image comprises receiving the image from image data that is captured by and received from a camera.

12. The automatic image selecting method of claim 9, wherein the receiving of an image comprises receiving the image from image data received over a communication network.

13. The automatic image selecting method of claim 9, wherein the receiving of an image comprises receiving the image from training data comprising images predetermined to recognize a specific category; and
the automatic image selecting method further comprises updating the predetermined category identification reference data in accordance with a result of the determining.

14. The automatic image selecting method of claim 9, wherein the predetermined category identification reference data comprises a plurality of category identification reference data, each of which is predetermined to recognize a different category.

15. The automatic image selecting method of claim 9, further comprising outputting a control signal to control an operation of storing the image in a local storage medium.

16. The automatic image selecting method of claim 9, further comprising outputting a control signal to control an operation of transmitting the image to a remote storage medium over a communication network and storing the image in the remote storage medium.

17. A non-transitory computer-readable storage medium storing computer-implementable instructions that, when executed by a processor of a computing device comprising a camera and a display, cause the processor to perform operations comprising:
receiving an image that is captured by the camera and currently displayed on the display;
extracting features from the image and outputting the extracted features as image features; and
determining whether each of the extracted features matches predetermined category identification reference data of a category different from that of other of the extracted features used for determining whether to store the image; and
automatically storing the image in response to the each of the features matching the predetermined category identification reference data.

18. The non-transitory computer-readable storage medium of claim 17, wherein the operations further comprise receiving, as the image, an image from image data received over a communication network.

19. The non-transitory computer-readable storage medium of claim 17, wherein the operations further comprise:
receiving, as the image, an image from training data comprising images predetermined to belong to the specific category; and
updating the predetermined category identification reference data in accordance with a result of the determining.

20. The non-transitory computer-readable storage medium of claim 17, wherein the predetermined category identification reference data comprises a plurality of category identification reference data, each of which is predetermined to recognize a different category.

21. The non-transitory computer-readable storage medium of claim 17, wherein the operations further comprise outputting a control signal to control an operation of storing the image in a local storage medium.

22. The non-transitory computer-readable storage medium of claim 17, wherein the operations further comprise outputting a control signal to control an operation of converting the image into an image signal, transmitting the image signal to a remote storage medium, and storing the image signal in the remote storage medium.

23. The non-transitory computer-readable storage medium of claim 17, wherein the computer-implementable instructions are provided as an independent application predetermined to recognize at least one specific category.

24. The non-transitory computer-readable storage medium of claim 17, wherein the computer-implementable instructions are provided as an independent application able to learn to recognize at least one category determined by a user.

25. A computing device comprising:
a camera;
a display;
a processor; and
a computer-readable storage medium storing computer-implementable instructions that, when executed by the processor, cause the processor to perform operations comprising:
receiving an image that is captured by the camera and currently displayed on the display;
extracting features from the image and outputting the extracted features as image features;
determining whether each of the extracted features matches predetermined category identification reference data of a category different from that of the other of the extracted features used for determining whether to store the image; and
automatically storing the image in response to the feature matching the predetermined category identification reference data.

26. The computing device of claim 25, further comprising a communication module configured to receive image data over a communication network;
wherein the operations further comprise receiving, as the image, an image from the image data received over the communication network.

27. The computing device of claim 25, wherein the operations further comprise:
receiving, as the image, an image from training data comprising images predetermined to belong to a specific category; and
updating the predetermined category identification reference data in accordance with a result of the determining.

28. The computing device of claim 25, further comprising a communication module configured to receive image data over a communication network;
wherein the operations further comprise, receiving, as the image, an image from training data comprising images that are received by the communication module and are predetermined to belong to a specific category.

29. The computing device of claim 25, wherein the predetermined category identification reference data comprises a plurality of category identification reference data, each of which is predetermined to recognize a different category.

30. The computing device of claim 25, wherein the operations further comprise outputting a control signal to control an operation of storing the image in a local storage medium.

31. The computing device of claim 25, further comprising a communication module configured to transmit image data to a remote storage medium over a communication network;
wherein the instructions further comprise outputting a control signal to control an operation of transmitting the image to the remote storage medium and storing the image in the remote storage medium.

32. The computing device of claim 25, wherein the computer-implementable instructions are provided as an independent application predetermined to recognize at least one specific category.

33. The computing device of claim 25, wherein the computer-implementable instructions are provided as an independent application able to learn to recognize at least one category determined by a user.

* * * * *